United States Patent [19]
Burroway et al.

[11] Patent Number: 5,698,666
[45] Date of Patent: Dec. 16, 1997

[54] PROCESS FOR FINISHING A RESIN FROM AN EMULSION POLYMERIZED LATEX

[75] Inventors: Gary Lee Burroway, Doylestown; Lance Walter Lewis, Hartville; John Charles Ullemeyer, Munroe Falls; Robert Donald Mate, Stow, all of Ohio

[73] Assignee: The Goodyear Tire & Rubber Company, Akron, Ohio

[21] Appl. No.: 663,550

[22] Filed: Jun. 13, 1996

[51] Int. Cl.$^6$ ............................................ C08F 6/22
[52] U.S. Cl. ............................ 528/487; 528/502 C
[58] Field of Search ....................... 528/487, 502 C

[56] References Cited

U.S. PATENT DOCUMENTS

4,910,850  3/1990  Sugimori et al. ..................... 29/240

*Primary Examiner*—Thomas R. Weber
*Attorney, Agent, or Firm*—Bruce J. Hendricks; Merchant Gould Smith Edell

[57] ABSTRACT

A process for finishing latex to form a dry resin and the resulting product. The process includes coagulating a latex of a thermoplastic polymer at a temperature at or just above the agglomeration temperature of the resin, dewatering the resin slurry to form a resin cake, drying the resin cake using extrusion technology to form a resin melt and solidifying the resin melt to form the resin. Preferred processes of the invention also include finishing the resin, such as by pelletizing and/or grinding it. More preferred processes of the invention include collecting and neutralizing the aqueous liquid byproducts from the dewatering and drying steps of the process. One embodiment of the invention includes utilizing water to solidify the resin melt, pelletizing the resin and drying the pellets. Most preferred processes of the invention include recycling any aqueous liquid byproducts of the solidifying and/or pellet drying steps, and recycling dried resin that is outside of the specification back into the resin cake drying step. Dried resins of the invention can have a moisture of not greater than 1.0% by weight and a residuals concentration of not greater than 500 ppm.

28 Claims, 1 Drawing Sheet

PROCESS FOR FINISHING A RESIN FROM AN EMULSION POLYMERIZED LATEX

The invention is directed toward a process for finishing a thermoplastic polymeric latex and products therefrom. In particular, the invention is directed toward a process for finishing a polymeric latex made by emulsion polymerization technology to form a dried resin.

BACKGROUND OF THE INVENTION

Emulsion polymerization technology is a well established means for preparing latex materials. Latex materials can then be finished to form a dried resin that is useful in a variety of applications, such as raw materials for tire and other rubber manufacturing processes or toner for photocopying machines. Processes for finishing latex to form a dried resin generally involve: recovering the polymer from the aqueous suspension; and processing the polymer to get it into the form of a dry resin.

Aqueous emulsion polymerization, typically, involves copolymerizing monomers, such as butadiene and styrene, in a water phase in the presence of a polymerization initiator, emulsifier and modifier. Generally, the copolymerization is performed at a temperature necessary to effect reaction of the styrene and butadiene, for example, and is continued until the desired conversion is attained. A latex results from this polymerization. The latex is coagulated, in typical processes, and the coagulum is washed and dried in order to form a dry resin.

U.S. Pat. No. 5,247,034, which issued on Sep. 21, 1993 to Mate et al., discusses emulsion polymerization technology with respect to producing a toner resin. Mate et al. disclose improving particular characteristics of these toner resins by adding amino acid soaps to the emulsion during processing.

An emulsion polymerization and latex dewatering process is disclosed in U.S. Pat. No. 2,615,206, which issued to Paul Lindstedt on Oct. 28, 1952. Lindstedt discloses syneresis, which as used herein is the contraction of a gel standing with the exudation of liquid. The Lindstedt process includes heating the slurry resulting from coagulation of an emulsion polymerized latex at a temperature that is below the agglomeration or softening temperature of the polymer until a mass of discrete particles is obtained and a form-sustaining mass is formed. This mass of particles (i.e. resin cake) is then shaped, in the Lindstedt process, by forcing the cake through a grid in order to form rods. These rods are then heated in a heating chamber at a temperature above the agglomeration temperature and dried in a heating chamber to form a resin having a moisture of about 0.75% by weight on a bone dry basis.

Generally for dewatering processes, if a substantial portion of the water is evaporated from the latex, then there is a tendency for the concentration of residuals in the resin to be higher than in resins having most of the water exuded as a liquid. This high residual level is most likely due to the fact that residuals can be carried away from the resin in liquid (e.g. water) that is exuded from the resin. However, typically, these residuals do not evaporate with the water.

In general, many processes for finishing latex to form a dry resin have a tendency to breakdown the thermoplastic polymer in such a manner that physical properties of the polymer, such as melt flow index and molecular weight distribution, can vary greatly for the polymer in the latex and the resulting dry resin. These modified characteristics are typically caused by mechanical or thermal breakdown of the polymer, which occurs under particular types of processing conditions subsequent to coagulation of the latex.

Therefore, there is a need for a process to finish latex to form a dry resin that minimizes the residuals concentration in the dried resin and that does not significantly alter polymer characteristics, such as molecular weight distribution and melt flow rheology.

SUMMARY OF THE INVENTION

We have discovered that by coagulating an emulsion polymerized latex at a temperature at or just above its agglomeration temperature, followed by dewatering, drying and solidifying steps, the resulting dry resin can have less polymer breakdown and a lower concentration of moisture and residuals when compared with resins that are not processed in this manner. We have found that the application of external heat to flux the resin cake prior to mechanical manipulation, reduces the amount of polymeric breakdown in the resulting resin. In addition, minimizing the number and severity of mechanical restrictions, such as extruder screw restrictions during processing, helps to reduce the mechanical and thermal breakdown of the resulting polymer. With the reduction of polymer breakdown, the polymer characteristics of the latex and the polymer characteristics of the resin can be about the same.

The claimed invention is directed toward a process for finishing an emulsion polymerized latex to form a dry resin without significantly altering the polymer's physical properties, such as molecular weight distribution or melt flow rheology. In general, the processes of the invention involve: coagulating an emulsion polymerized latex at a temperature at or just above the resin agglomeration temperature to form a resin slurry, dewatering the resin slurry to form a resin cake, drying the resin cake to form a resin melt using extrusion technology, and solidifying the resin melt to form the resin. The dewatering step can be at a temperature that is not less than the agglomeration temperature of the resin. Most preferably, sulfuric acid is used as the coagulant.

Once the resin melt is solidified to form a resin, the resin can then be converted to other forms, such as by pelletizing the resin and/or grinding the resin. One advantage of the present invention is the ability to recycle aqueous effluents from the dewatering and drying steps and to recycle resin fines, for example.

Resins finished using a process of the invention typically have a moisture of not greater than about 1.0% by weight and preferably of not greater than about 0.5% by weight. They also have a residuals concentration of not greater than about 500 ppm. In addition, the amount of moisture is generally uniform throughout the resulting dry resin. Dry resins finished by the process of the invention usually have a residuals concentration of not greater than 10 ppm. As used herein, the term "residuals" refers to inorganic salts, such as potassium sulfate, sodium sulfate, or acetate. These residual salts, typically, are byproducts of the neutralization of the coagulant and/or polymerization additives. The term residuals, as used herein, does not include residual monomer.

As used herein, the terms "dry resin" or "dried resin" refer to a resin having a moisture of not greater than about 1.0% by weight on a bone dry basis. Unless otherwise noted, all of the moisture percentages herein are by weight on a bone dry basis. The term "emulsion polymerized" when referring to any noun, refers to something that is produced or obtained using emulsion polymerization technology. For example, emulsion polymerized latex refers to a latex that has been produced using emulsion polymerization technology. The terms "coagulation" or "coagulating" refer to the irreversible aggregating or aggregation of semi-solid particles from solution.

As used herein, the term "agglomeration temperature" refers to a range of temperatures as measured at atmospheric pressure (i.e., 1 atm) in accordance with the procedure identified below, during which liquid exudes from a coagulum. Typically, agglomeration temperatures are at least about 120° F. and not greater than about 200° F. For styrene-butadiene copolymers, the agglomeration temperature is about 140° F. to about 160° F. The term "coagulum" refers to the coagulated mass that results from a coagulation step of the process of the invention. For styrene-butadiene copolymers, generally the agglomeration temperature range is from about 140° F. to 160° F.

In preferred processes, a resin cake formed during a first or second dewatering step does not have a moisture greater than about 30% by weight. The dewatering step can include centrifuging the resin slurry. Most preferably, the resin cake is dried and further dewatered by extruding the resin cake in a corotating intermeshing twin screw extruder. In this most preferred embodiment, the further dewatering drying step is at a temperature that is not less than the agglomeration temperature of the resin.

In preferred embodiments, the step of drying the resin cake includes exuding liquid in such a manner that the concentration of residuals in the dry resin is not greater than about 500 ppm.

In addition to previously discussed steps, preferred processes of the invention include steps of washing the resin cake by slurrying it in an agitated tank and then dewatering this slurried resin cake using a suitable screening device. Most preferred processes include only one wash step. As used herein, the term "slurrying" refers to placing a resin cake into a resin slurry.

Coagulation of the latex in preferred processes is performed at a pH of not greater than about 4.0. The pH is lowered by adding an acid, such as sulfuric acid, to facilitate coagulation of the polymer.

Furthermore, in preferred embodiments, the pH of the effluents from the dewatering and drying steps of the invention, is neutralized so that these liquids are more compatible with the atmospheric environment.

In most preferred embodiments, the dewatering and drying steps of the invention are performed using centrifugation, extrusion, and/or filtration.

Processes of the invention include solidifying the resin melt to form a resin. Solidifying the resin melt usually involves cooling the resin so that it is converted from an amorphous to a solid state. Preferred processes of the invention use water to cool the resin melt, and then dry the resin melt to form a dry resin of the invention.

Most preferred processes of the invention use a water slide to cool the resin melt and to feed the resin into a finishing step of the process, such as a pelletizer. While in the pelletizer, the resin is pelletized and dried to a moisture of not greater than about 1.0% by weight. In most preferred embodiments, the water used in the water slide and collected from the dryer is filtered and recycled back to the water slide.

Following solidification, the dry resin pellets can be ground into particles. For particular applications, these particles have an average longest dimension of not greater than about 500 microns. Generally, the particle size ranges from about 100 microns to about 500 microns.

The invention is also directed towards a dry resin made by the process of the invention, and dry resins having a residuals concentration of not greater than about 500 ppm. Most preferably, dry resins of the invention do not have a residuals concentration of greater than about 10 ppm. Typically, resins of the invention have a residual monomer concentration of not greater than about 50 ppm.

Polymers of dry resins made using a process of the invention generally maintain their physical characteristics. In particular, the melt flow index of emulsion polymerized linear polymers included in the latex is within two or three points of the melt flow index of the resulting dry resin, when measured under the same conditions. Typically, the absolute viscosity of emulsion polymerized cross-linked polymers included in the latex is within about 20% of the absolute viscosity of the dry resin when measured under the same conditions. Examples of polymers included in the invention are styrene-butadiene copolymers and styrene butylacrylate polymers.

The latex processed in the invention is of thermoplastic polymers, such as styrene-butadiene copolymer. Furthermore, typically, resins finished using the process of the invention have a molecular weight distribution that is about 10% or less different than the molecular weight distribution of the latex.

With the processes of the invention, we have made relatively pure resins having residuals concentrations of no greater than 500 ppm and typically of no greater than 10 ppm. Furthermore, the moisture in the resins is usually not greater than about 1%.

DESCRIPTION OF PREFERRED EMBODIMENTS

Figure 1:
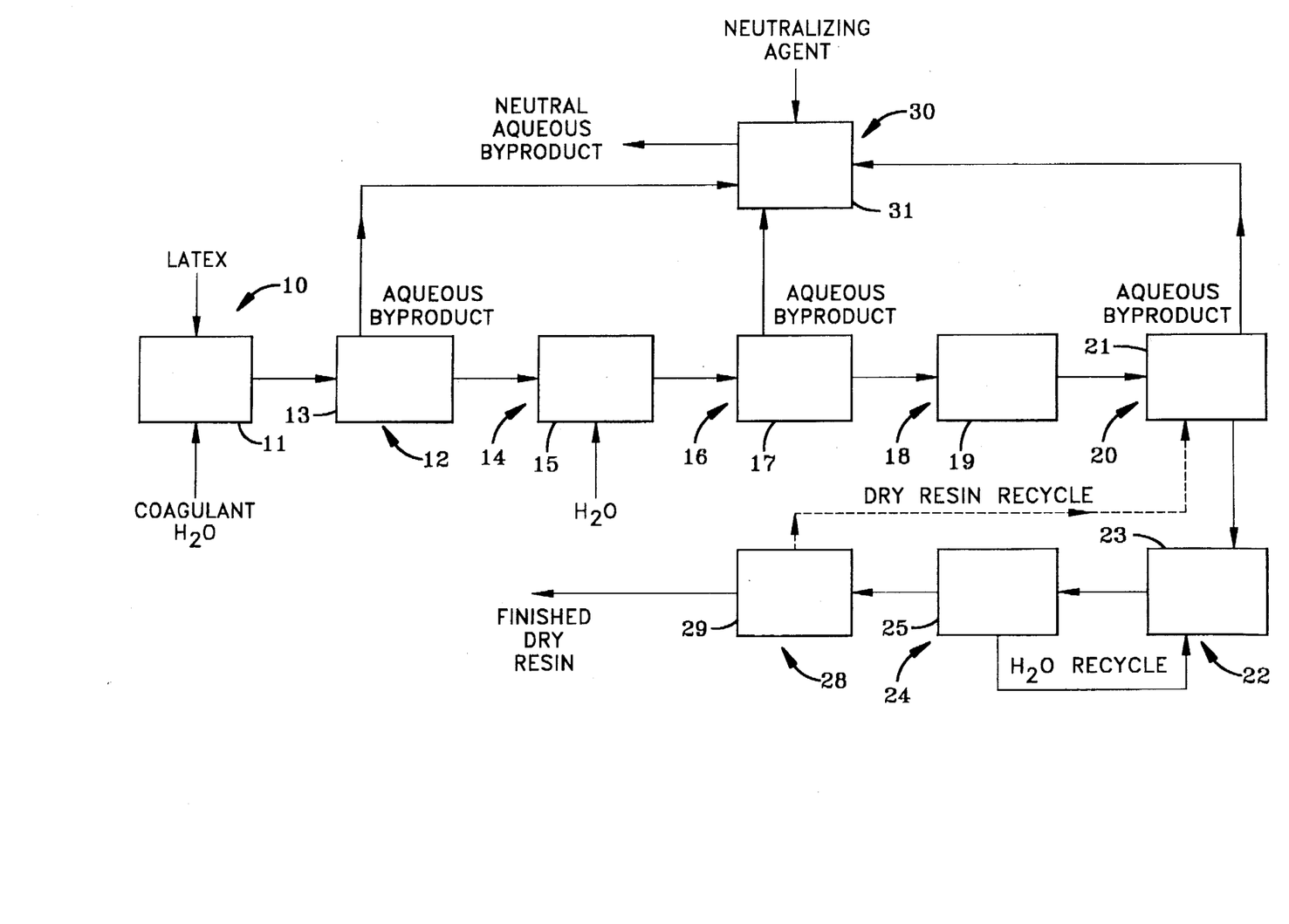
The FIGURE is a schematic illustration of a process of the invention.

The invention is a process for finishing emulsion polymerized latex to form a dried resin without significantly modifying the molecular weight distribution or melt flow rheology of the thermoplastic polymer. The invention is also directed toward resins made using this process. Dried resins of the invention are made using the invention usually have a moisture of not greater than about 1.0% by weight and a residuals concentration of not greater than about 500 ppm. Typically, the residuals concentration is not greater than about 10 ppm.

Processes of the invention include coagulating an emulsion polymerized latex to form a resin cake. This coagulation, in accordance with the invention, is performed at atmospheric pressure at or just above an agglomeration temperature for the resin. The resin slurry obtained from the coagulation step, in accordance with the invention, is dewatered, and, in preferred embodiments, washed. Most preferably, centrifugation is used in the dewatering process. Resin cake, in accordance with the invention, is pumped into an extrusion driven drying process to form a resin melt. The resin melt is then solidified, and preferably, pelletized and ground for storage.

Latex and Resin Processing

Coagulation

In general, there are three types of thermoplastic resins: linear resins, cross-linked resins, and resins with added functionalities. Latexes, which are precursors to these types of resins, are made from emulsion polymerization techniques that are well-known in the art. Typically, these techniques involve reacting a buffer, monomers, a polymerization initiator, and any other additives in an agitated tank to form a liquid emulsion. Compounds for controlling the particle size in the latex, chain transfer agents, catalysts and molecular weight and rheology controlling agents are added as reactants. Subsequent to the reaction, the emulsion is blended in an agitated tank, and for many applications, strained to remove any large particles of coagulum.

Usually, the emulsion at this point is in the form of a latex that is ready for coagulation. In particular, typical latex formulations can include water, sodium hydroxide, rosin soap, sodium sulfate, monomers, such as styrene and butadiene, dodecyl mercaptan, and potassium persulfate.

Any type of thermoplastic latex can be used in the invention. A latex useful for the invention can be formed as disclosed in U.S. Pat. No. 2,615,206. Other useful latex formulations are disclosed in U.S. Pat. No. 5,247,034. Both of these patents are hereby incorporated by reference. Once the emulsion polymerized latex is formed, it is coagulated.

Coagulation system 10, as identified in the FIGURE, includes an agitated coagulation tank 11, and any other equipment necessary to facilitate coagulation of the latex into a resin slurry. This system can include a tank for mixing any coagulant with water prior to pumping the coagulant into a coagulation tank. In accordance with the invention, the latex is continuously fed into agitated coagulation tank 11, which also contains water and a suitable coagulant.

In general, any tank that can withstand the conditions of coagulation (e.g. low pH) and provide the necessary conditions for coagulation is useful in the invention. Typically, 3/16 stainless steel or rubber lined tanks are used. The size of the tank to be used varies with the application and amount of the latex to be processed.

Typically, axial flow turbine agitation is used in coagulation tank 11, and in accordance with the invention, usually, the agitating means is operated at about 300 rpms. The agitation means at this rate should be capable of circulating the tank contents. Coagulation tank 11 in accordance with the invention is operated at a temperature that is at or just above the agglomeration temperature of the resulting resin. Therefore, coagulation tank 11 should be capable of maintaining this temperature during processing.

We have also found that the amount of coagulant that is continuously fed into coagulation tank 11 affects the characteristics of the resulting dry resin. Typically, if the coagulant is fed into coagulation tank 11 at too low of a flow rate, then incomplete coagulation can occur resulting in trapped or occluded latex in the resin. This phenomenon can undesirably affect the physical properties of the resin. If the coagulant is fed at a flow rate that is too high, then processing efficiency may not be optimized and processing time can be lengthened. Furthermore, too little coagulant can undesirably affect the particle size of the coagulum in such a manner that it may not be retained by the equipment during dewatering steps. In other words, if there is too little coagulant, the particle size could be so small that the coagulum is not separated from the aqueous liquid during the dewatering steps.

In general, if the coagulant is concentrated sulfuric acid, then it typically is fed into the coagulation system at a rate of at least about 1 lb/min. and not greater than about 2 lbs/min. At this rate, physical and chemical properties of the dry resin are optimized, when about 80 lbs/min.–140 lbs/min. of latex is fed into coagulation tank 11. It is understood that the coagulant flow rate can vary with the type of coagulant used and the type and flow rate of the latex polymer.

In general, the coagulant feed rate, in accordance with the invention, is adjusted based upon the amount of solids retained in a first dewatering step. Typically, if the percent solids in the resin case is low, then coagulant flow rate is probably too low. If the coagulum masses are so large that they are interfering with the process (e.g., having trouble flowing through the equipment), then the coagulant flow rate may be too high because too much agglomeration is taking place in the process.

Any coagulant that can initiate agglomeration of an emulsion polymerized latex is useful in the invention. Examples of useful coagulants are disclosed by Mate et al. in U.S. Pat. No. 5,247,034 at column 6, lines 5–26, which was previously incorporated by reference. Preferred coagulants include sulfuric acid, calcium chloride, magnesium sulfate, zinc sulfate, hydrochloric acid, acetic acid, aluminum sulfate and various polyamines. If aluminum sulfate is used as the coagulant, then a typical feed rate is at least about 3 lbs/min. and not greater than about 3.3 lbs/min., when the latex flow rate is about 80 lbs/min.–140 lbs/min. If a polyamine is used as a coagulant, than a typical feed rate is at least about 2.25 and not greater than about 4.5 lbs/min., when the latex feed rate is about 80 lbs/min.–140 lbs/min. Concentrated sulfuric acid is most preferred.

Water (i.e., fresh) is also fed into coagulation tank 11 to facilitate coagulation. The amount of water that is fed varies with the type and amount of latex and the amount of coagulant that are fed into the tank. Typically, not more than about 400 lbs/min. of water is fed into coagulation tank 11. The set temperature of coagulation tank 11 is, in accordance with the invention, at least an agglomeration temperature of the resin. We have found that by setting the temperature in the coagulation tank at or just above the agglomeration temperature, the exudation of liquid can begin taking place during the coagulation process, and a dry resin can be produced that retains a minimum amount of water.

If the temperature in coagulation tank 11 is lower than the resin agglomeration temperature, then the resulting resin tends to have a higher moisture and/or residuals concentration. However, if the coagulation temperature is too high, then total agglomeration can occur resulting in a few large particles instead of many relatively small particles in the resin slurry.

Upon exiting coagulation system 10, the resin slurry typically is about 13% solids. Preferably, the resin slurry is at least about 10% solids and not greater than about 15% solids. If the solids percentage is too high, then the slurry can be too thick to process, and if the solids percentage is too low, then the process may not be operating at optimal conditions.

Dewatering and Washing

Once the latex is coagulated to form a resin slurry, the slurry is dewatered and, preferably, washed, in order to provide a sufficient separation between the liquid and the solids. Any types of dewatering or drying systems and/or equipment known in the art can be used to dewater the resin slurry or the cake resin. For example, centrifugation, vacuum filtration, vibrating screen filtration, single screw extrusion, or twin screw extrusion can be used in dewatering steps of the invention.

In preferred embodiments, there are at least two dewatering steps of the invention. The first is dewatering of the resin slurry and the second is dewatering of the slurried resin cake. The extrusion step, which is generally characterized herein as a drying step, can also be characterized as a dewatering step.

Dewatering of Resin Slurry

Once coagulated in coagulation system 10, the resulting resin slurry is fed into a first dewatering system 12, which preferably is a filtration system 13. Typically, dewatering system 12 includes a suitable screening device for separating solids from liquids in the resin slurry. Dewatering system 12 should remove as much of the free water and residuals in the resin slurry as possible. We have found that filtration system 13 best facilitates accomplishment of this goal. Any type of filtration system useful in a process for finishing latex and that can withstand the low pH and relatively warm temperatures of the resin slurry is useful in this invention. Filtration system 13 includes a filter and any other equipment necessary to separate liquid from the resin slurry solids. Filtration system 13 should also be capable of dewatering the resin slurry to at least 50% solids. For example, a Sweco Screener, commercially available from Sweco of Cleveland, Ohio as a 60" screener is useful in filtration system 13.

Typically, resin cake exiting dewatering system 12 has a moisture of about 50% by weight. Preferably, the resin cake has a maximum of about 65% moisture.

Washing and Slurrying of Resin Cake

Once the resin cake is dewatered, it is preferred that it be fed into a continuous wash/slurrying system 14 in order to facilitate minimizing the concentration of residuals in the resulting dry resin. Water is continuously fed into wash system 14 along with the cake resin from dewatering system 12 in order to slurry the resin cake. The feed rates are adjusted so that typically the slurry is about 85% liquids in wash tank 15.

Wash system 14 includes an agitated wash tank 15 and any other equipment that is needed to facilitate washing and slurrying of the cake resin. The temperature of the tank is typically just below the agglomeration temperature of the resin (i.e., for most applications about 100° F.). If the temperature in the wash tank is too high, then total agglomeration can occur resulting in too few particles that are too large. If wash tank 15 temperature is too low, then the flow rate of the slurried resin cake is lowered and process time can be lengthened. Furthermore, if the temperature is too low, additional heat may have to be used to heat the resin cake to its drying temperature later in the process. Typically, the temperature in wash tank 15 is at least about 130° F. and not greater than about 140° F. The wash tank 15 temperature should be at least about 100° F.

Any type of agitated wash tank that is useful in finishing latex to form a dry resin and that can withstand the low pH and relatively warm temperatures is useful in the invention. For example, the same type of tank used for coagulation can be used for slurrying the resin cake. Tanks usable for slurrying the resin tank are commercially available from Manchester Tank & Equipment Co. of Kettering, Ohio and Buckeye Boiler Co. of Dayton, Ohio. Typically, the agitating means in the tank is operated at about 250 rpms. The agitation means is generally operated in such a manner that the slurry is continuously being circulated. The slurried resin is continuously fed into resin cake dewatering system 16.

Dewatering of Resin Cake

A second dewatering system 16 is used to separate liquid from the resin cake exiting wash system 14. Any type of dewatering system useful in finishing latex to form a dried resin and that can obtain the desired moisture level useful in this step. We prefer using a centrifuge system 17 for dewatering the resin cake. Centrifuge system 17 includes a centrifuge and can include any other equipment necessary to centrifuge the slurried resin cake. The slurried resin cake continuously enters dewatering system 16 from wash system 14.

We have found that using a centrifuge system for this dewatering step can facilitate obtaining a relatively low resin cake moisture upon discharge from this dewatering system. In particular, a centrifuge system commercially available from TEMA Systems, Inc. of Cincinnati, Ohio as model number 450 is most preferred. If this particular centrifuge system is used, the basket rpm speed is usually set to between about 2550 and 2700. In general, this setting is limited by the centrifuge equipment itself. We prefer basket speeds to be as high as the equipment will allow without having an equipment failure.

Typically, the moisture content of the resin cake exiting dewatering system 16 is not greater than about 30%. In general, a moisture at this stage of between about 20% and 30% is preferred in the invention. Dewatering system 16 should be operated and set up in such a manner that the resin cake upon exit is not more than about 30% moisture. Once the resin cake is dewatered in dewatering system 16, it enters another dewatering/drying step that utilizes extrusion technology.

Extruding

The extrusion step included in the process of the invention preferably includes use of an extruder feeding system 18 and an extruder system 20. Extruder feeding system 18 facilitates control of the resin cake entering extruder system 20. The resin cake exiting dewatering system 16 collects in extruder feeding system 18, which includes a volumetric feeder that regulates flow into extruder system 20. The volumetric feeder includes a surge tank that allows accumulation of materials for controlling the resin cake feed rate into extrude system 20. This type of extruder feeding system helps to prevent system hold ups in the first part of the process when there is a shut down or back up in the back part of the process.

Extruder feeding system 18 can be any type of extruder feeding system useful in a process for finishing latex to form a dry resin. Extruder feeding system 18 preferably includes an extruder feeder 19 and any equipment that is needed to regulate flow into extruder system 20. For example, a volumetric feeder having a vibrating hopper and a feeder, is useful in the invention and is commercially available from Metal Fab of Vernon, N.J. as model numbers DB15-6 and PB25, respectively. The surge tank is most preferably a screw feed tank similar to coagulation tank 11.

Subsequent to exiting extruder feeding system 18, the cake resin enters extruder system 20. Extruder system 20 can include any type of extruder 21 that is useful for finishing latex to form a dried resin. For example, corotating intermeshing twin screw extruders, tangential twin screw counterrotating extruders, or counterrotating intermeshing extruders can be used in extruder system 20. We have found a corotating intermeshing twin screw extruder 21 to be the most preferred extruder. An example of this type of extruder is manufactured by Werner & Pleiderer of Ramsey, N.J. and is disclosed in U.S. Pat. No. 5,151,026, which issued to Andersen et al. on Sep. 29, 1992, and which is hereby incorporated by reference.

Preferred extruders are capable of heating the cake resin from extruder feeder system 18 gradually. This gradual heating facilitates non-evaporative separation of the solids from the liquids. Thus, the residuals concentration can be minimized.

Extruder system 20 is designed to have several liquid discharge points so that the exuded liquid can expeditiously exit the system. The extruder screw profile should be designed to accomplish this water removal with minimum change in the chemical and physical properties of the resin. For example, the screw clearances and speeds of extruder 21 should not facilitate physical or chemical breakdown of the polymer. The temperature profile also should not facilitate polymer breakdown. The temperatures, die pressure and screw speeds of extruder 21 should be optimized to obtain minimal chemical and physical breakdown of the polymer.

In general, the physical properties of the resins made from the process of the invention should be about the same as the physical properties of the latex. Differences in molecular weight distribution, absolute viscosity, and the melt flow index are indicators of the extent to which the polymer has broken down during processing. The cake resin exits extruder system 20 as resin melt, and the melt must get cooled to form a resin. In one preferred embodiment of the invention, the resin melt enters pelletizing system 22 from a strand die included in extruder 21. The resin can be extruded through a die for cooling and further processing. For example, the melt can be extruded into a sheet or rods at the end of the extrusion step.

In general, the resin melt can be cooled in any means known in the art to form a resin. After cooling, the resin can be further processed, such as by pelletizing or grinding the resin. Once the resin is formed, whether and how it is further processed will be determined by the end use of the resin and the method used to cool the resin melt. For example, we most prefer, for particular applications, to cool the resin melt using a water slide and further pelletizing, drying and grinding the resin. However, for some applications, the melt can be cooled without using water and another drying step may not be needed to complete the resin processing. It is understood that various methods of cooling the resin melt and further processing the resin can be utilized to obtain a dry resin useful for particular applications. In this embodiment, the resin melt is forced out of the extruder in the form of rods that enter a water slide and a pelletizing system 22.

Pellet Formation and Processing

Pelletizing system 22 includes pelletizer 23, and pellet drying system 24. Pellet drying system 24 includes pellet dryer 25. Any type of pelletizing system and pellet drying system that are useful in resin processing are useful in the invention. In most preferred embodiments, the resin melt enters the pelletizing system by a waterslide (i.e. water table) upon which the resin melt rods enter pelletizing system 22. In addition, pelletizing system 22 and/or pellet drying system 24 most preferably includes a water filtering, conditioning, and recycling system for recycling water evaporated in pellet dryer 25 back to the waterslide. A pelletizing system useful in the invention is commercially available from ConAir Jetro of Bay City, Mich. as model number T212.

Typically, the diameter of pellets exiting pelletizer 23 varies with the end use of the pellets. The water temperature, flow rate and pelletizer speed (i.e. pelletizer cutter speed) are regulated to cool the resin melt and obtain pellets of the appropriate diameter for each particular application.

Prior to exiting pelletizing system 22, the pellets are heated in pellet dryer 25 to evaporate surface moisture acquired from the water slide. Generally, if the temperature in pellet dryer 25 is too high, then the resin could melt. If the temperature in pellet dryer 25 is too low, then the surface moisture may not evaporate. Typically the temperature in pellet dryer 25 is at least about 130° F. and not greater than about 160° F.

Typically, the pellets leaving pellet dryer 25 have a moisture of not greater than about 1.0% by weight. Preferably, the moisture is not greater than about 0.5% by weight.

Once the pellets are dried, they can be continuously ground into particles for storage prior to further use. Grinding system 28 can include any type of grinder that is useful for processing dry resins and any other equipment that is necessary for the grinding process. The grinding system 28 can also be included in processes of the invention that do not include a pelletizing system. We have found that a Hammer Mill type grinder 29 can be particularly useful. This type of grinder is commercially available from Scott Grinder Co. of Minneapolis, Minn. as model number 18-30. Typically, the particles exiting grinding system 28 have an average longest dimension of not greater than about 500 microns. Preferably, the average longest dimension of the particles is at least about 200 microns and not greater than about 800 microns. However, it is understood that the ground particle size can vary according to end use requirements.

The ground dry resin particles can now be stored or transported for further processing.

Dried Resin Recycle

Ground dry resin particles that for some reason are not satisfactory (e.g., particle size is too small) can, preferably, be recycled back to extrusion system 20 for reprocessing. Any type of recycle system that is useful in dry resin reprocessing and that can be used to recycle resin back to an extruder, in accordance with the invention, can be used. The recycle step is shown on the FIGURE by a perforated line connecting grinder 29 with extruder 21.

In general, the amount of recycled product entering the extruder cannot be so high that the properties of the resin melt are undesirably affected by the unsatisfactory product. Generally, no more than about 20% by weight of the product being fed into extrusion system 20 can be recycled resin without affecting the chemical and/or physical characteristics of the resulting dry resin. In most preferred embodiments, this recycle step is operated on a batch basis as needed.

Effluent Recycle

In most preferred embodiments of the invention the process includes an effluent recycle and neutralizing system 30 as shown in the FIGURE. In most applications, since coagulation processing requires use of chemicals not having a neutral pH, the liquid effluents from dewatering systems 12 and 16 and extrusion system 20 are not sufficiently neutral to be recycled into the environment without a pH adjustment.

Liquid byproducts of dewatering systems 12 and 16 and extrusion system 20 are preferably collected and the pH neutralized so that the liquids can be recycled back into the environment. Recycle and neutralizing system 30 includes a neutralization tank 31 and any other equipment necessary to recycle and neutralize the pH of the effluents. An example of a tank useful as a neutralization tank is a $\frac{3}{16}$ steel or rubber lined tank useful in the coagulation process.

Any type of recycle and neutralizing system that is useful in latex and cake resin finishing processes is useful in the invention. Preferably, the recycle and neutralizing system 30 can adjust the pH of the effluents to at least about 6 and not greater than about 8. Recycle and neutralizing system 30 is preferably continuous with a neutralizing agent, such as sodium hydroxide, being fed into tank 31 at a sufficient rate to neutralize incoming liquids.

Resulting Dry Resin and Its Uses

The resulting dry resins of the invention generally have physical properties that approximate the physical properties of the latex polymer. Finishing latex to form a dry resin has a tendency to chemically and physically breakdown thermoplastic polymers. This breakdown can be undesirable because particular polymers are many times selected for particular applications based upon their physical properties. Thus, it is usually undesirable for a dry resin not to exhibit the particular properties for which it was originally selected and that the latex polymer exhibited. Therefore, it is desirable for a dry resin to have approximately the same physical properties as its latex polymer.

Melt flow index, absolute viscosity, residuals concentration, and residual monomer concentration are all indicators of the polymer's physical properties. Significant differences between these characteristics of the latex polymer and the dry resin can indicate polymer breakdown. If, for example, the melt flow index of the latex polymer is significantly higher than for the dry resin (e.g., at least 3 points for a linear polymer), then there is evidence of significant polymer breakdown. If, for example, the absolute viscosity of the latex is much higher than for the dry resin (i.e., at least about 20% for a cross-linked polymer), then this is evidence of polymer breakdown. Process conditions, in accordance with the invention, are adjusted to operate the process efficiently while minimizing polymer breakdown. For example, extruder temperatures, die pressures and screw clearances are optimized to reduce polymer breakdown. In general, higher temperatures, higher die pressures and small screw clearances have a tendency to facilitate polymer breakdown. These process conditions tend to reduce the melt flow index and/or absolute viscosity of the dry resins.

In general, melt flow index and absolute viscosity are dependent upon the type of polymer that is being measured and the test used to obtain the measurement. However, the difference between each of these indicators for the latex and the dry resin of each polymer can generally be useful for comparisons. Typically, linear polymers of the invention and processed in accordance with processes of the invention, do not have a difference in their latex and resin melt flow indices of greater than about 3. This difference is based upon the melt flow index being measured in accordance with ASTM D1238-89.

Absolute viscosity is the preferred indicator of the polymer's rheology for cross-linked polymer. Typically, cross-linked polymers of the invention and processed in accordance with the invention do not have a difference of greater than about 25% and preferably 20% in their latex and resin absolute viscosities. Resins of the invention, and processed in accordance with the invention, generally do not have a residuals concentration of greater than 500 ppm. Typically, resins of the invention do not have a residuals concentration of greater than about 10 ppm. Furthermore, resins of the invention and processed in accordance with the invention typically do not have a residual monomer concentration of not greater than about 50 ppm.

Resins of the invention can be used in a variety of applications. These applications generally include uses as coatings and/or paints. For example, resins of the invention can be used in interior and exterior paints, including paints for swimming pools and in coatings for mechanical parts. Furthermore, resins of the invention can be used as reinforcers in rubber compounds, toners, and coatings.

EXAMPLES

The processes of the invention are useful for dewatering and finishing of all types of emulsion polymerization thermoplastic latexes. The following examples detail processes representative of those useful with at least a couple of different types of thermoplastic latexes.

With respect to determining the agglomeration temperature for each resin, we used the procedure outlined in U.S. Pat. No. 2,615,206 to Lindstedt beginning at column 4, line 69 and ending at column 5, line 52. As used herein, the terms "agglomeration temperature" and "softening temperature" are used interchangeably.

EXAMPLE 1

Process for Producing Dried Resin from Emulsion Polymerized Latex

A latex, which was about 36% solids by weight, and that was prepared in accordance with U.S. Pat. No. 5,247,034 to Mate et al. and having 91 parts styrene and 9 parts butadiene, was finished to form a dry resin as follows. The latex was fed at a rate of 120 lbs/min. into an agitated tank useful as a coagulation tank and having an agitation means rotating at 300 rpm. A 1000 gallon 3/16 stainless steel tank was used. Simultaneously, 365 lbs/min. of water and 1.14 lbs/min. of concentrated sulfuric acid (i.e., about 99% sulfuric acid) were fed into the tank. The tank had a temperature of 159° F., which is within the agglomeration temperature of the resin. The pH of the tank mixture was about 1.7 and coagulation of the polymer began. The latex was allowed to coagulate until the resin slurry was about 13% solids.

Once coagulated, the coagulum (i.e., resin slurry), which was 13% by weight solids, entered the first dewatering step, which consisted of a screening device commercially available as a 60" screener from Sweco of Cleveland, Ohio. Water was sprayed into the screening device at a rate of 10 lbs/min., and 44 lbs/min. of resin cake was filtered and fed into a slurry/wash tank. The aqueous liquid, which ran through the filter, was directed toward a pH neutralizing system and into the environment. The pH neutralizing system consisted of an agitated, unheated stainless steel tank into which enough sodium hydroxide was charged in order to neutralize the pH of the aqueous liquid to about 6.

The slurry tank, having the resin cake therein, was agitated at a rate of 250 rpms and was operated at a temperature of 100° F. Water flowed at a rate of 200 lbs/min. into the slurry tank. The resin cake slurry upon exit from the slurry tank was 15% solids.

The slurried resin cake was then centrifuged in a continuous centrifuge device manufactured by TEMA Systems, Inc. of Cincinnati, Ohio and is commercially available as model number 450. This centrifuge was operated at a basket rpm of 2680, and screen wash (i.e., process water) was charged into the centrifuge at a rate of 0.1 lbs/min. The aqueous liquid from the centrifuge was directed into the pH neutralizing system. The aqueous liquid to be recycled was 1% solids by weight.

The centrifuged cake resin, which had a moisture of about 25% was fed into the extrusion feeder at a rate of about 150 lbs/min. initially and eventually at a rate of 500 lbs/min. The extruder feeder was a volume metered hold tank that regulated the flow of cake resin into the extruder for dewatering drying. The extruder feeder used has two components, a vibrating hopper, which is commercially available as model number DB15-6, and a feeder, which is commercially available as model PB25, both from Metal Fab of Vernon, N.J.

The cake resin exited the extruder feeder and entered a corotating intermeshing twin screw extruder commercially available from Werner & Pfleiderer of Ramsey N.J. and described in U.S. Pat. No. 5,151,026, which issued on Sep. 29, 1992 to Andersen et al. and which was previously incorporated by reference. The extruder disclosed in this patent was placed in an upside-down position so that liquid exuded during extrusion could easily exit the process. The main extruder screw was operated initially at an rpm rate of 150 and at full speed was operated at an rpm rate of 400. The extruder had two side feeders, which were used as drains. The first side feeder was operated at an rpm rate of 105, and the second side feeder was operated at an rpm rate of 150.

As the product moved through the extruder, it passed through 10 temperature zones having increasingly higher temperatures as indicated below.

| ZONE TEMPERATURES | (°F.) |
| --- | --- |
| 1 | 200 (Start Up) |
| 1 | 380 (Full Rate) |
| 2 | 250 (Start Up) |
| 2 | 390 (Full Rate) |
| 3 | 390 |
| 4 | 350 |
| 5 | 350 |
| 6 | 380 |
| 7 | 380 |
| 8 | 380 |
| 9 | 395 |
| 10 | 400 |

The temperatures for zones 1 and 2 were initially set to 200° F. and 250° F., respectively, and after about a half hour were reset to 380° F. and 390° F., respectively.

The extruder had four water removal points so that when the product discharged from the extruder die plate, it was dry. The resin melt was discharged from the extruder through a strand die into the waterslide used to feed the pelletizing system.

The waterslide, pelletizing and pellet drying system is commercially available from ConAir Jetro of Bay City, Mich. as model number T212. This system included a water table (i.e. water slide), a pelletizer, a pellet dryer, and a water filtering, conditioning and recycling system. The strands exiting the extruder die were pulled down the waterslide to the pelletizer. The water temperature, water flow rate, and pelletizer speed were controlled to yield ⅛" diameter pellets. The water and pellets were separated at the pellet dryer. The water from the waterslide was filtered to remove any solids, cooled to the desired process temperature and recycled back to the waterslide. The pellets were dried with heated air to remove any surface moisture, and the pellets discharged to the grinder.

The water slide water flow rate was 950 lbs/min., and the water temperature was 103° F. The pelletizer cutter was operated at an rpm of 800. The pellet dryer air temperature was 155° F., and the air flow rate pressure difference in the pellet dryer was about 1 atm. The moisture of the pellets exiting the dryer was about 0.5% by weight.

The pellets were continuously ground upon exiting the pellet dryer in a Hammer Mill type grinder that is commercially available from Scott Grinder Co. of Minneapolis, Minn. as model number 18–30. The average size of the longest dimension of the ground particles was 500 microns. The grinder was operated at an rpm of 1800, and the product was then air conveyed to a product storage hopper.

The dry resin made from this process had a melt flow index of 15.9, and the melt flow index of the blended latex varied from 13.1 to 14.5. This variation is due to the fact that a number of latex batches were fed into the coagulation tank. The melt flow index was measured according to ASTM D1238-89. In particular, the melt flow index was measured using a melt flow index machine, which is commercially available from Tinius-Olson of Willow Groves, Pa. as model number MP-993.

The remaining residual styrene concentration was 33 ppm in the blended latex and 24 ppm for the dry resin.

EXAMPLE 2

A Second Process for Producing Dried Resin from Emulsion Polymerized Latex

A dried resin was made in accordance with the process of Example 1 with the following exceptions. The latex was fed into the coagulation tank at a rate of 130 lbs/min. The water was fed into the coagulation tank at a rate of 415 lbs/min., and the concentrated sulfuric acid was fed into the coagulation tank at a rate of 1.53 lbs/min. The water fed into the first dewatering device, the Sweco screener, was fed at a rate of 12 lbs/min., and the cake resin that was filtered out, exited the filter at a rate of about 48 lbs/min. The amount of water fed into the slurry tank was 215 lbs/min., and the feeder full flow rate was 550 lbs/min. In addition, the first side feeder was operated at 150 rpm, and the 10 temperature zones were as detailed in the table below.

| ZONE TEMPERATURES | (°F.) |
| --- | --- |
| 1 | 200 (Start Up) |
| 1 | 425 (Full Rate) |
| 2 | 250 (Start Up) |
| 2 | 425 (Full Rate) |
| 3 | 425 |
| 4 | 350 |
| 5 | 350 |
| 6 | 380 |
| 7 | 380 |
| 8 | 380 |
| 9 | 395 |
| 10 | 400 |

The water slide water flow rate was 1000 lbs/min. The melt flow index for the blended resin varied between 13.6 and 14.3, and the melt flow index for the dry resin was 15.5. The residual styrene concentration of the blended latex was 44 ppm and for the dry resin was 31 ppm.

EXAMPLE 3

A Third Process for Producing Dried Resin from Emulsion Polymerized Latex

A dried resin was made in accordance with Example 1 with the following modifications. The latex was fed into the coagulation tank at a rate of 140 lbs/min. The water was fed into the coagulation tank at a rate of 430 lbs/min., and the concentrated sulfuric acid was fed into the coagulation tank at a rate of 1.59 lbs/min. The water fed into the first dewatering device, the Sweco filter, was fed at a rate of 15 lbs/min., and the cake resin that was filtered out exited the filter at a rate of about 52 lbs/min. The amount of water fed into the slurry tank was 228 lbs/min., and the feeder full flow rate was 710 lbs/min. In addition, the first side feeder was operated at 150 rpm, and the main extruder screw was operated at a full rate of 430 lbs/min. The 10 temperature zones of the extruder were as detailed below.

| ZONE TEMPERATURES | (°F.) |
| --- | --- |
| 1 | 200 (Start Up) |
| 1 | 445 (Full Rate) |
| 2 | 250 (Start Up) |
| 2 | 445 (Full Rate) |
| 3 | 445 |
| 4 | 350 |
| 5 | 350 |
| 6 | 380 |
| 7 | 380 |
| 8 | 380 |
| 9 | 395 |
| 10 | 400 |

The water slide water flow rate was 1050 lbs/min., and the pelletizer cutting rate was 820 rpm. The melt flow index of the blended latex varied between 13.2 and 13.3, and the melt flow index of the finished resin was 15.5. The residual styrene concentration of the blended latex was 43 ppm, and the residual styrene concentration of the finished resin was 36 ppm.

EXAMPLE 4

A Fourth Process for Producing Dried Resin from Emulsion Polymerized Latex

Using a latex having 79 parts styrene and 21 parts butylacrylate and made as identified in Example 1, a dried resin was prepared in accordance with Example 1 with the following modifications. The latex was fed into the coagulation tank at a rate of 100 lbs/min. The water was fed into the coagulation tank at a rate of 275 lbs/min., and the concentrated sulfuric acid was fed into the tank at a rate of 1.23 lbs/min. The water fed into the first dewatering device, the Sweco filter, was fed at a rate of 17 lbs/min., and the cake resin exited the filter at a rate of 37 lbs/min. The amount of water fed into the slurry tank was 185 lbs/min. at a temperature of 110° F. The centrifuge was operated at a basket rpm of 2575, and the feeder full flow rate was 220 lbs/min. In addition, the first side feeder was operated at 220 rpm, and the main extruder screw was operated at a start up rate of 150 rpm and a full rate of 250 rpm. The 10 temperature zones of the extruder were as detailed below.

| ZONE TEMPS | (°F.) |
| --- | --- |
| 1 | 195 (Start Up) |
| 1 | 250 (Full Rate) |
| 2 | 250 (Start Up) |
| 2 | 300 (Full Rate) |
| 3 | 300 |
| 4 | 350 |
| 5 | 350 |
| 6 | 380 |
| 7 | 380 |
| 8 | 380 |
| 9 | 395 |
| 10 | 400 |

The water slide water flow rate was 1150 lbs/min., and the pelletizer cutting rate was 375 rpm with a water temperature of 105° F. The pellet drying temperature was 150° F.

The absolute viscosity of the blended latex varied between 106,637 and 109,810. The glass transition temperature of the latex was 55.2° C. The absolute viscosity of the finished resin varied between 84,400 and 92,272. The glass transition temperature was 55.3° C. The absolute viscosity was measured using a Monsanto Rubber Process Analyzer commercially available as model RPA-2000 from Monsanto Co. of St. Louis, Mo. A Rheometrics Visco-elastic Tester commercially available as model number RVE-M from Rheometrics Corp. The absolute viscosity was measured under the following conditions: 150° C., 5% strain, and a frequency of 1 radian/sec.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A process for finishing latex to form a dry resin; said process comprising steps of:

(a) coagulating a thermoplastic latex at a temperature that is not less than an agglomeration temperature of the resin to form a resin slurry;

(b) dewatering the resin slurry to form a resin cake; and (c) drying the resin cake, wherein said step of drying the resin cake includes extruding the resin cake to form a resin melt; and (d) solidifying the resin melt to form the resin.

2. A process of claim 1 wherein the step of coagulating the latex includes mixing the latex with sulfuric acid.

3. A process of claim 2, wherein the latex includes a linear polymer, wherein the sulfuric acid is concentrated, and wherein the sulfuric acid is fed into a coagulation tank at a rate of at least about 1 lb/min. and not greater than about 2 lbs/min.

4. A process of claim 1 wherein the step of dewatering the resin slurry to form a resin cake includes forming a resin cake having a moisture of not greater than about 30% by weight.

5. A process of claim 1 wherein the agglomeration temperature is at least about 140° F. and not greater than about 160° F.

6. A process of claim 1 wherein the step of dewatering the resin slurry includes centrifugation.

7. A process of claim 1 wherein the step of drying the resin cake includes extruding the resin cake from a corotating intermeshing twin screw extruder.

8. A process of claim 1 wherein the step of drying the resin cake includes exuding liquid in such a manner that the concentration of residuals in the dried resin is not greater than 500 ppm.

9. A process of claim 1 further comprising steps of slurrying the resin cake and dewatering the resin cake.

10. A process of claim 1 wherein the step of solidifying the resin melt to form the resin includes utilizing water to cool the resin melt to form a wet resin; and drying the resin.

11. A process of claim 1 wherein the step of coagulating the latex is performed at a pH of not greater than about 4.0.

12. A process of claim 1 wherein the step of drying is at a temperature that is not less than an agglomeration temperature of the resin.

13. A process of claim 1 further comprising a step of neutralizing pH of effluents originating as byproducts from the dewatering and drying steps.

14. A process of claim 1 wherein the step of coagulating the latex includes coagulating at a temperature of at least 120° F. and not greater than 200° F.

15. A process of claim 14 wherein a styrene-butadiene copolymer is coagulated at a temperature of at least about 140° F. and not greater than about 160° F.

16. A process of claim 14 wherein a styrene butylacrylate copolymer is coagulated.

17. A process for finishing latex to form a dry resin, said process comprising steps of:
   (a) coagulating thermoplastic to form a resin slurry;
   (b) dewatering the resin slurry to form a resin cake;
   (c) washing the resin cake;
   (d) dewatering the resin cake;
   (e) drying the resin cake, wherein said step of drying the resin cake includes extruding the resin cake to form a resin melt;
   (f) solidifying the resin melt to form the resin; and
   (g) finishing the resin.

18. A process of claim 17 wherein the step of coagulating is performed at a pH of not greater than about 4.0.

19. A process of claim 17 further comprising steps
   (a) collecting effluents from the dewatering and drying steps having a non-neutral pH; and
   (b) neutralizing the pH of the effluents.

20. A process of claim 17 wherein the step of washing the resin cake includes only one step of slurrying the resin cake.

21. A process of claim 17 wherein the step of solidifying the resin melt includes steps of:
   (a) utilizing water to cool the resin melt to form a resin;
   (b) pelletizing the resin to form resin pellets; and
   (c) drying the resin pellets, wherein the resin pellets have a moisture of not greater than about 1.0% by weight; and wherein the step of finishing the dry resin includes a step of:
      (a) grinding the resin pellets to form ground dry resin particles, wherein the particles have a longest average dimension of not greater than about 500 microns.

22. A process for finishing latex to form a dry resin, said process comprising steps of:
   (a) coagulating a thermoplastic latex at a temperature that is not less than an agglomeration temperature of the resin to form a resin slurry;
   (b) filtering the resin slurry to form a resin cake;
   (c) washing the resin cake;
   (d) centrifuging the resin cake;
   (e) drying the resin cake, wherein said step of drying the resin cake includes extruding the resin cake to form a resin melt;
   (f) utilizing water to cool the resin melt to form a resin;
   (g) pelletizing the resin to form resin pellets;
   (h) drying the resin pellets; and
   (i) grinding the pellets to form ground dry resin particles.

23. A process of claim 22 wherein the step of drying is at a temperature that is not less than an agglomeration temperature of the resin.

24. A process of claim 22 wherein the step of utilizing water to cool the resin melt includes a step of:
   (a) feeding the resin melt into a pelletizer using a water slide.

25. A process of claim 22 wherein the step of drying the resin pellets includes:
   (a) filtering solids from water that is separated from the resin pellets; and
   (b) recycling the water back into the water slide.

26. A process of claim 22 wherein the step of drying the dry resin pellets includes drying the pellets to a moisture of not greater than about 1.0% by weight.

27. A process of claim 22 wherein the step of grinding the pellets includes grinding to particles having an average longest dimension of not greater than 500 microns.

28. A process of claim 1 wherein the step of dewatering the resin to form a resin cake is at a temperature that is not less than an agglomeration temperature of the resin.

* * * * *